United States Patent

Byars et al.

[11] Patent Number: 5,128,513
[45] Date of Patent: Jul. 7, 1992

[54] BUS BAR ARRANGEMENT FOR AN ELECTRICALLY HEATED VISION UNIT

[75] Inventors: Joe B. Byars, Lincoln Park; John D. Youngs, Rockwood, both of Mich.

[73] Assignee: Ford Motor Company, Dearborn, Mich.

[21] Appl. No.: 542,473

[22] Filed: Jun. 22, 1990

[51] Int. Cl.⁵ .............................................. B32B 17/00
[52] U.S. Cl. .................................. 219/203; 219/547; 219/522; 219/543
[58] Field of Search ............... 219/203, 547, 522, 543; 338/306, 307, 308, 309, 310, 311, 312, 313, 314; 52/171

[56] References Cited

U.S. PATENT DOCUMENTS

| | | | |
|---|---|---|---|
| 3,313,920 | 4/1967 | Gallez | 219/203 |
| 3,621,441 | 11/1971 | Hudnall et al. | 338/309 |
| 4,443,691 | 4/1984 | Sauer | 219/203 |
| 4,543,446 | 9/1985 | Ramus | 219/203 |
| 4,668,270 | 5/1987 | Ramus | 219/543 |
| 4,725,710 | 2/1988 | Ramus et al. | 219/203 |
| 4,743,741 | 5/1988 | Ramus | 219/543 |
| 4,744,844 | 5/1988 | Hurst | 219/203 |
| 4,820,902 | 4/1989 | Gillery | 219/203 |

Primary Examiner—Bruce A. Reynolds
Assistant Examiner—Michael D. Switzer
Attorney, Agent, or Firm—Charles H. Ellerbrock; Roger L. May

[57] ABSTRACT

An electrically heated vision unit, such as a windshield, has bus bars extending substantially parallel to, and spaced from, each other in contact with an electrically conductive film provided on a surface of a transparent substrate. One bus bar extends laterally beyond the corresponding end of the opposite bus bar, an end portion at such corresponding end of the opposite bus bar being recessed away to avoid excessive current density at such recessed end portion.

16 Claims, 3 Drawing Sheets

BUS BAR ARRANGEMENT FOR AN ELECTRICALLY HEATED VISION UNIT

BACKGROUND OF THE INVENTION

1. Technical Field

This invention is directed to an electrically heated (i.e., heatable) vision unit, for example an electrically heated windshield of a motor vehicle. An electrically heated vision unit may be defogged and deiced by application of an electric current to an electrically conductive film on or in the transparent substrate of the vision unit. More particularly, the invention is directed to an electrically heated vision unit having a new and advantageous arrangement of an upper bus bar in contact with the upper edge of the electrically conductive film.

2. Background Art

Systems are known for heating vision units such as architectural glass, motor vehicle windows and the like. A preferred technology, now in commercial use, employs an electrically conductive film or coating covering most of the area of a transparent substrate, for example an inside surface of one of the two glass plys in a typical motor vehicle laminated windshield. The electrically conductive film is substantially transparent to radiation in the visible wavelength range. Exemplary of such technology is that disclosed in U.S. Pat. No. 4,543,466 issued on Sep. 24, 1985 to Ramus, entitled "Bus Bar Arrangement for Uniformly Heating a Trapezoidally-Shaped Electrically Heated Windshield", which is assigned to the assignee of the present invention and the disclosure of which is incorporated herein by reference. Therein an electrically heated windshield is disclosed to comprise an electrically conductive layer interconnecting a horizontally extending upper bus bar and a horizontally extending lower bus bar. To reduce costs and avoid undue manufacturing complexity, the electrically conductive wires from the vehicle electrical system to the two bus bars typically are run bundled together to the bottom of the windshield. There, a first of the wires is connected to the lower bus bar and the second wire, to complete the circuit, is connected to an electrically isolated conductive path extending in the windshield to the upper bus bar. Specifically, such conductive path extends horizontally below the lower bus bar to one side of the windshield and from there vertically to the upper bus bar.

The lower bus bar of the electrically heated windshield of the Ramus patent is wider (i.e., has greater lateral dimension) than the upper bus bar. This is quite common in electrically heated windshields, because motor vehicle windshields are typically wider at the base and the bus bars (both upper and lower) extend across substantially the entire lateral dimension of the windshield. Thus, the right-hand and left-hand ends of the lower bus bar extend beyond the upper bus bar. During heating of the windshield, since the upper bus bar is less wide, it carries a higher current density than the lower bus bar. The current density tends not to be evenly distributed across the upper bus bar. Rather, the right-hand and left-hand end portions have a much higher current density, since they provide a disproportionate amount of electrical power to the corresponding extended end portions of the lower bus bar. As a result, so called "hot spots" develop at the end portions of the upper bus bar. This is disadvantageous, since overall performance would be improved if electrical current density (and hence heating) were more evenly distributed.

It is an object of the present invention to provide improved electrically heated windshields and more particularly, to overcome the aforesaid "hot spot" problem in present electrically heated windshields and in vision units generally wherein one bus bar extends beyond the other. These and other object and advantages of the invention will be better understood in the light of the following disclosure.

SUMMARY OF THE INVENTION

According to the present invention an electrically heated vision unit comprises an electrically conductive, substantially transparent film on a surface of a substantially transparent substrate, and bus bars spaced from and substantially parallel to each other, in electrical contact with the transparent film. An end of a first one of the bus bars extends laterally beyond the corresponding end of the second bus bar, which corresponding end has a step recess to increase its distance from the first bus bar. The end portion which is step recessed and, therefore, further from the opposite bus bar carries for that reason lower current density than it otherwise would. This results in more uniform current distribution along that bus bar and avoids or reduces the severity of a hot spot at the recessed end.

In the context of a motor vehicle windshield, the present invention typically comprises an electrically conductive film stack deposited on a surface of a first glass ply which is then laminated to a second ply by a sheet of polyvinyl butyral or other flexible polymeric laminating material. An upper bus bar extends across the windshield near its top edge and a lower bus bar extends across the windshield near the bottom edge of the windshield. Since the bottom of a vehicle windshield is generally wider than the top the lower bus bar typically is laterally wider than the upper bus bar, extending beyond the upper bus bar at both ends. To avoid hot spots at the ends of the upper bus bar in accordance with the present invention, the end portion at each end of the upper bus bar is recessed. That is, the lower edge of the upper bus bar at each end is moved upward (relative to the lower edge of the rest of the upper bus bar) to increase its distance from the lower bus bar. The increased distance to the lower bus bar decreases the current load carried by the recessed end portions, resulting in more uniform current distribution along the upper bus bar and the elimination or diminution of hot spots at the end portions of the upper bus bar.

BRIEF DESCRIPTION OF THE DRAWINGS

The novel features of the present invention are discussed in further detail below in connection with the accompanying drawings wherein.

DETAILED DESCRIPTION OF PREFERRED EMBODIMENTS

Reference to the present invention as an electrically heated vision unit should be understood to mean that the vision unit can be heated by application of electrical power to a circuit which includes electrically conductive elements of the vision unit. Thus, the vision unit is adapted to be used or to be installed for use with constant or interruptable connection to a source of electrical power to cause heating of the vision unit, such as for purposes of defogging or deicing the vision unit. The following discussion will be in terms of a particular preferred application for a vision unit of the invention, specifically, an electrically heated motor vehicle windshield. It should be recognized, however, that numerous alternative applications of the invention are possible, including side and rear windows for a motor vehicle, architectural glass, lenses and the like.

Figure 1:
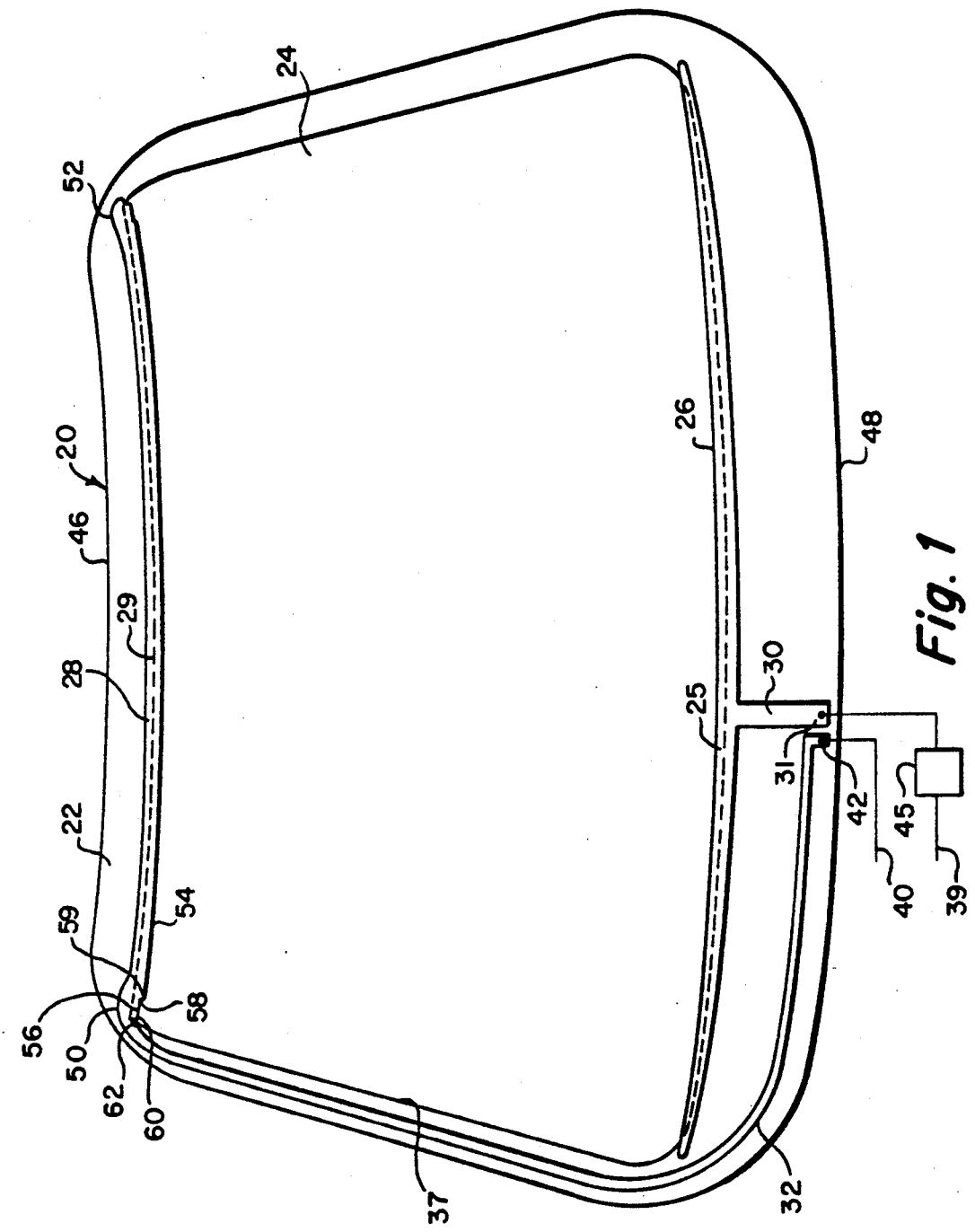
FIG. 1 depicts an electrically heated vision unit, specifically, a motor vehicle windshield according to a preferred embodiment of the invention.
Figure 2:
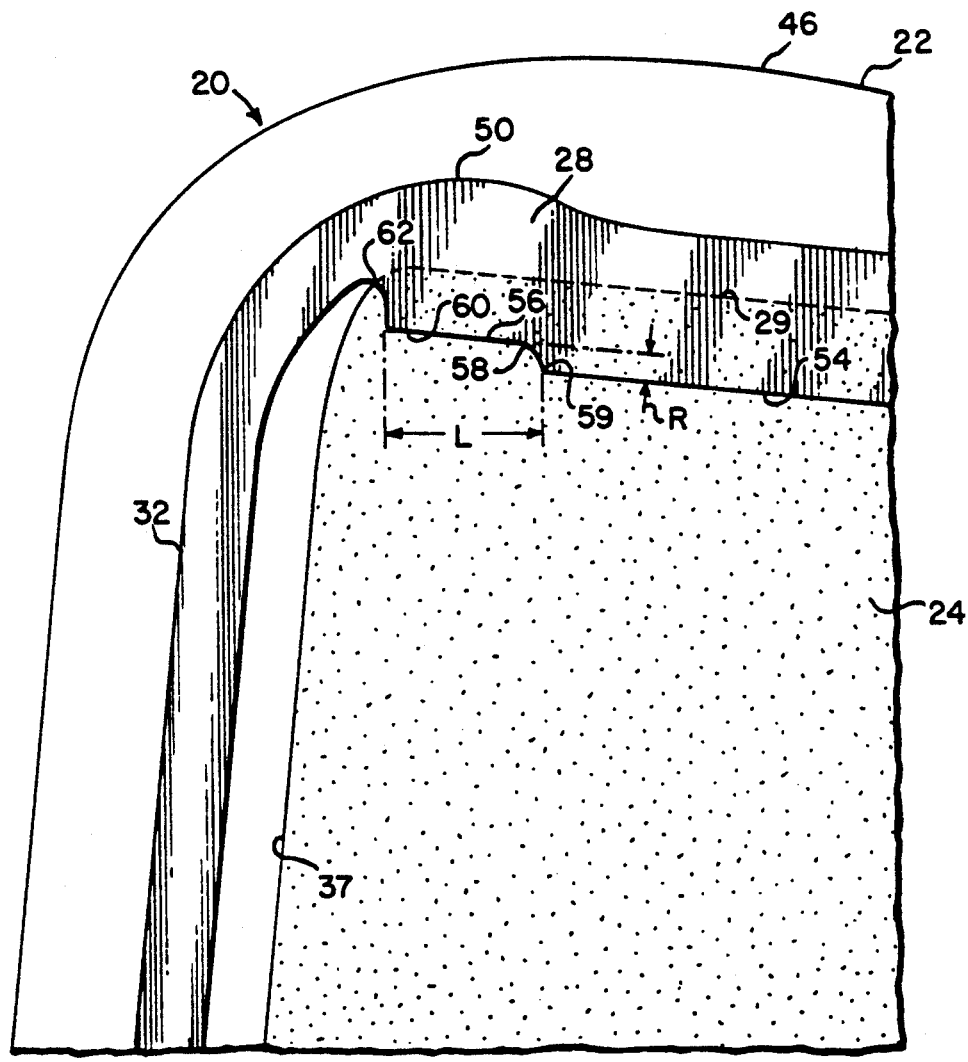
FIG. 2 is an enlarged view of portion A of FIG. 1.

Referring now to FIGS. 1 and 2, an electrically heated motor vehicle windshield 20 comprises a transparent, self-supporting substrate 22. As used herein the term "transparent" means substantially transparent at least to visible light, that is, to radiation in the visible wavelength range. Numerous suitable transparent substrate materials and constructions will be apparent to the skilled of the art in view of the present disclosure. Selection of a particular substrate material and construction will depend in large part on the particular application to be made of the vision unit. For motor vehicle windshield applications, it presently is preferred to employ a multi-ply, laminated construction wherein two sheets of glass are used to form the substrate, the two sheets of glass being united by an interlayer of polyvinylbutyral ("PVB") or other flexible, polymeric laminating layer in a manner well known to those skilled in the art. Windshield 20 is seen to further comprise a continuous, electrically conductive, transparent film 24 on a surface of the substrate. The term "electrically conductive film" is used herein to mean a coating or the like applied in any suitable manner to the surface of the substrate. In a motor vehicle windshield the film typically is applied to a laminated surface, i.e. to a surface of a ply of the windshield which will be laminated to a surface of another ply, e.g., a PVB laminating layer. Various suitable methods for forming the film are known to those skilled in the art and will be apparent in view of the present disclosure. The electrically conductive film may be applied to a glass or plastic surface of the windshield, for example by a magnetron sputtering operation. Magnetron sputtering of electrically conductive, transparent films onto such surfaces is well known in the art. In accordance with preferred embodiments of this invention, the film comprises a film stack, i.e., a multi-layer coating wherein a metal film, preferably silver, is sandwiched between dielectric films, preferably zinc oxide (with a chromian oxide interlayer between the zinc oxide and the PVB laminating layer) tantalum pentoxide, or the like. Numerous alternative materials are commercially available and known to those skilled in the art.

As noted above the transparent substrate may be a multi-layer (or multi-ply) substrate. The various electrically conductive elements may be located on the same or different substrate surfaces, preferably laminated surfaces of the substrate layers. In accordance with certain preferred embodiments of the invention intended for use as an electrically heated motor vehicle windshield wherein the transparent substrate comprises a laminated construction of two sheets of glass with a polyvinylbutyral interlayer, the electrically conductive film, the bus bars and electrically conductive leads to the bus bars (the bus bars and leads being described further below) are applied on a surface of one of the sheets of glass which will become a laminated surface in the windshield. The conductive film, bus bars and leads may, for example, be placed on the laminated surface closest to the exterior of the motor vehicle. In this way the conductive film, bus bars and electrically conductive leads are protected from abrasion and the like, yet the system is able to quickly heat the exterior surface of the windshield to melt ice and snow on the windshield. The electrically conductive components also could be placed on an exterior surface, e.g., on a surface of a substrate consisting of glass. This may be suitable particularly for vision units intended for applications other than as a motor vehicle windshield.

The electrically heated windshield 20 is seen to further comprise generally laterally extending lower bus bar 26 which is in substantially continuous line contact with the lower edge 25 of the conductive layer 24. By continuous line contact is meant that the lower bus bar is in electrical contact with the lower edge 25 of the conductive layer 24 substantially without discontinuity or break along at least most of the lateral expanse of such lower edge. Similarly, generally horizontally extending upper bus bar 28 is in substantially continuous line contact with the upper edge 29 of the conductive layer 24. Thus, layer 24 electrically interconnects the upper bus bar 28 to the lower bus bar 26. Various suitable materials and constructions for the bus bars are known to those skilled in the art and will be apparent in view of the present disclosure. For motor vehicle windshield embodiments of the invention, the bus bars typically will be made of a silver ceramic material, as known in the art. Bus bars formed of this material are applied, typically, by a silk screen printing operation using a liquid printing material, usually to the same interior surface of the transparent substrate to which the conductive layer 24 has been or is to be applied. The liquid material is dried such that the finished bus bars are bonded to the surface of the substrate. It should be recognized that while the electrically conductive layer 24, for purposes of illustration, is depicted in the drawing as if it were visible, in motor vehicle windshield applications of the invention the layer is substantially transparent to visible light. It may or may not impart a visible coloring to the vision unit. The upper and lower bus bars and the electrically conductive leads thereto would be visible if currently preferred silver ceramic materials and production methods were used.

When it is desired to electrically heat the vision unit, electrical power is provided to the upper and lower bus bars. For this purpose the windshield embodiment shown in the drawings further comprises a lower conductive lead 30 integral with the substrate. It can be seen that lead 30 is electrically isolated (or must be otherwise electrically insulated) from the conductive layer except through its electrical contact with the lower bus bar. According to the preferred embodiment shown, the lower conductive lead 30 extends on the substrate vertically from a point below the lower bus bar to approximately the lateral center point of the lower bus bar. Terminus 31 of lead 30 is seen to be proximate the lower perimeter of the windshield, at which location electrical connection can be made conveniently to power line 39, typically a current-carrying wire. In the case of a motor vehicle, such wire would connect the lower bus bar either to ground or, more preferably, to the "hot" wire from the vehicle battery or, more preferably, the generator or alternator. The terminus 31 typically is soldered to a solder pad on the end of the aforesaid power line 39. In general, the use of pre-soldered pads is preferred, since it facilitates making the electrical connections, particularly in the context of assembling a motor vehicle, and is found to provide a secure and sturdy electrical connection.

To complete the electrical circuit, electrical connection must be made to the upper bus bar. Such connection is made by an electrically conductive lead 32 on the surface of the substrate. It will be apparent from this disclosure that such conductive lead must be electrically isolated (or otherwise insulated) from the other electrically conductive components of the vision unit except through the upper bus bar 28. Accordingly, the conductive lead 32 is seen to be laterally spaced outside (to the left in FIGS. 1 and 2) the boundary, i.e., the corresponding side edge 37, of the conductive layer 24. In the preferred embodiment shown, the conductive lead 32 to the upper bus bar is electrically connected at terminus 42 to a wire or other electrical lead 40 from the motor vehicle battery or, preferably, the alternator or generator. The connector preferably is by pre-soldered pad, as described above. Lead 40, being connected to the upper bus bar, preferably is connected to ground.

The electrically heated vision unit of the invention shown in FIGS. 1 and 2 comprises several additional preferred features. Specifically, lower bus bar 26 is seen to taper toward each end. This is preferred since the current load carried by the lower bus bar diminishes toward the outer ends thereof as current is passed into the electrically conductive layer 28 along the length of the bus bar. Tapering the lower bus bar reduces the amount of material used in forming it and, since such material typically comprises silver, this in turn reduces the cost of the product. Power line 39 comprises shutoff circuitry 45. Such circuitry is known to those skilled in the art and comprises means for sensing an electrical fault in an electrically conductive component of the system. In the vision unit of the invention, such circuitry would serve to interrupt current flow to the vision unit in the event of such a fault.

The windshield 20 shown in the drawing is generally of trapezoidal shape, this being dictated by the aerodynamic styling typical of certain motor vehicles. Since the windshield is of generally trapezoidal shape, the electrically conductive layer 24 also has a generally trapezoidal shape in accordance with known principles for achieving heating, and hence defogging, deicing, etc., over a large portion of the area of the windshield. The lower bus bar 26 and the upper bus bar 28 each is substantially laterally coextensive with the windshield. Thus, upper bus bar 28 is almost as wide as upper edge 46 of the windshield 20 and lower bus bar 26 is almost as wide as lower edge 48 of the windshield 20. As a result of the trapezoidal shape, lower bus bar 26 extends laterally to tee right and to the left beyond corresponding ends 50 and 52 of the upper bus bar 28. It should be noted that left end 50 of the upper bus bar 28 continues without interruption into electrically conductive lead 32, as best shown in FIG. 2. The central region of upper bus bar 28 corresponds with a like region of lower bus bar 26 having approximately equal lateral dimensions. The end portions of the lower bus bar, in contrast, correspond with and draw current principally from upper bus bar end portions of smaller lateral dimension. To avoid a disproportionate current draw through the end portions of the upper bus bar as a result of the current draw by the over-extending end portions of the lower bus bar, the present invention recesses the end portions of the upper bus bar away from the lower bus bar. Such recessing of the end portions of the upper bus bar will be described with particular reference to FIG. 2 wherein one preferred embodiment of the invention is illustrated. It will be recognized in view of the present disclosure that the recessing of the end portion of upper bus bar 28 proximate the right end 52 would mirror that shown for the end portion 56 proximate left end 50 described below. Lower edge 54 of upper bus bar 28 is seen to be recessed upwardly at end portion 56. The lateral dimension L of end portion 56 and the distance R that it is recessed are selected to be sufficiently large to reduce excessive heating of the electrically conductive film in the area immediately surrounding such end portion. Generally, the exact dimensions will not be critical and it will be a matter easily within the ability of those skilled in the art to select suitable dimensions L and R given the present disclosure. For purposes of exemplification, in a typical motor vehicle windshield, being about fifty-four inches wide at the upper edge and having an upper bus bar about forty-eight inches wide, and being about sixty-eight inches wide at the lower edge and having a lower bus bar about sixty inches wide, dimension L would be from about one to about three inches, preferably about one and one-quarter inches and dimension R would be from about one-eighth to about one inch, preferably about one-quarter inch. Typically, dimension R is about one-half to about one-eight the magnitude of dimension L. In general, dimensions L and R are selected such that the current load through the end portion 56 is sufficiently low or, taking an alternative suitable measure, the degree of heating of the electrically conductive film 24 in the region surrounding such end portion 56 is sufficiently reduced to meet relevant performance guidelines applicable to the product in question.

In the preferred embodiment illustrated in FIGS. 1 and 2, end portion 56 is step recessed, specifically, lower edge 54 of the bus bar is substantially straight, as shown, except at the end portions 52 and 56. As best seen in FIG. 2, lower edge 54 of end portion 56 of the upper bus bar 28 is substantially straight after being recessed by means of small radius turns 58 and 59. In the typical motor vehicle windshield embodiment of the invention having the exemplary dimensions recited immediately above, turns 58 and 59 each would have a radius from about one-eight to about one-half inch, more preferably from about one-quarter inch. Preferably, the step recess in such embodiment would have a lateral dimension L equal to about 1% to 6% preferably about 2.5% that of the upper bus bar overall lateral dimension. Preferably, edge 54 in step recessed portion 60 runs substantially parallel to the remainder of lower edge 54. Alternative suitable configurations for the recess will be apparent to those skilled in the art in view of the present disclosure.

It can be seen that upper bus bar 28 intersects the boundary 37 of the electrically conductive film 24 at intersection 62. The upper bus bar is further recessed at intersection 62, relative to the step recessed end portion 56, away from the lower bus bar. This further minor recess serves to eliminate or reduce otherwise excessive heating and current flow at such intersection. Referring to the typical windshield described above, such further recessing of the lower edge 54 of upper bus bar 28 would typically be a substantially semi-circular area having radius of about one-eighth to about one inch, preferably about one-quarter inch. It will be within the ability of those skilled in the art, in view of this disclosure, to provide a suitable further recess at intersection 62.

Figure 3:
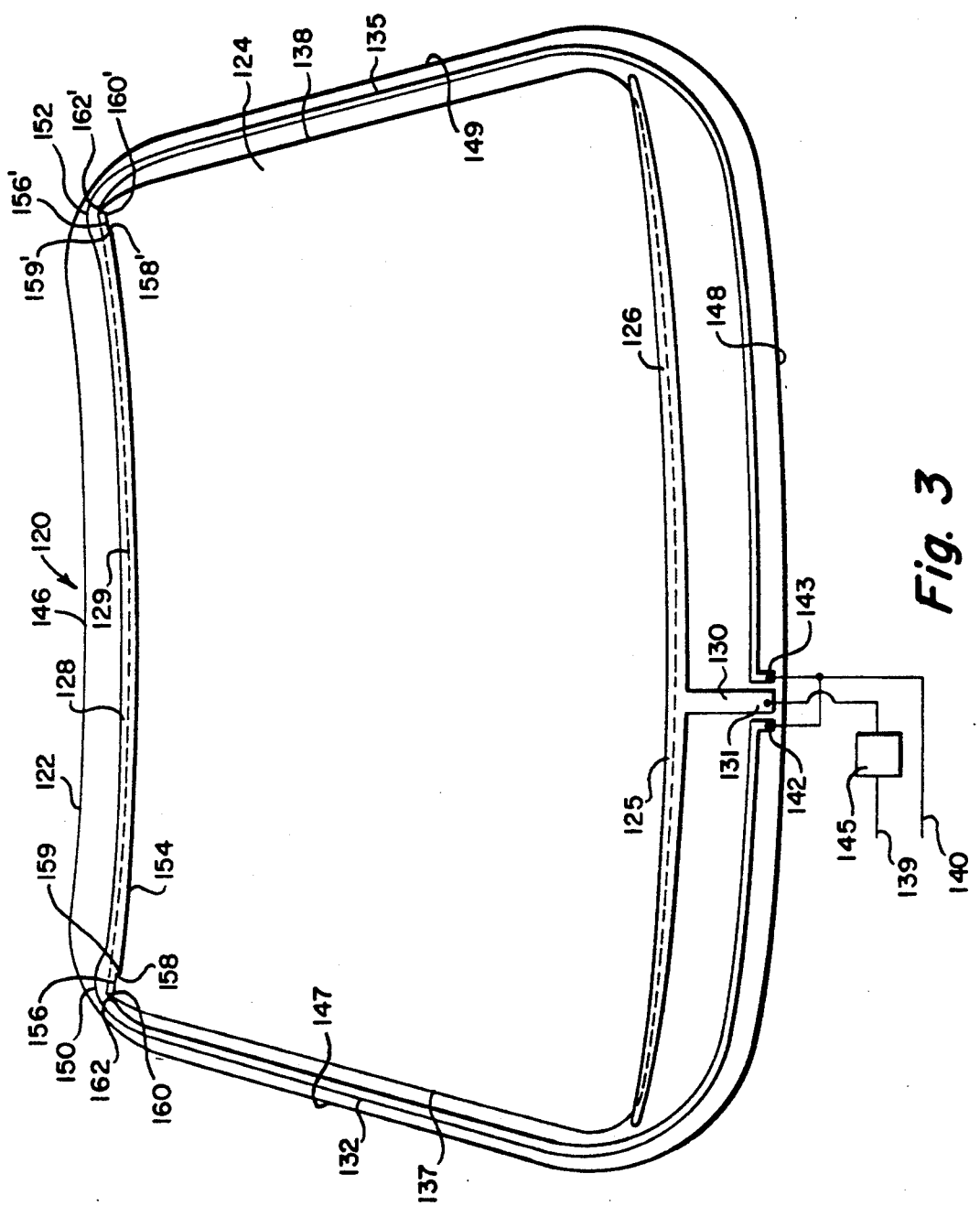
FIG. 3 depicts an electrically heated vision unit, specifically, a motor vehicle windshield similar to the windshield of FIG. 1, according to a second preferred embodiment of the invention wherein electrical power is fed to the upper bus bar by two leads.

Referring now to FIG. 3, an alternative embodiment of the invention is depicted wherein electrically conductive leads carry electrical current to both ends of the upper bus bar. More specifically, electrically heated motor vehicle windshield 120 comprises a transparent, self-supporting substrate 122, preferably comprising two plys of glass, plastic or like material laminated together by a layer of PVB or other flexible, polymeric laminating material. Windshield 120 is seen to comprise a continuous, electrically conductive, transparent film 124. Film 124 would be deposited, for example, by sputter deposition as described above in connection with the embodiment of FIGS. 1 and 2, preferably onto a laminated surface of one ply of the windshield. Windshield 120 has a lower edge 148, an upper edge 146 a left side edge 147 and a right side edge 149. Lower bus bar 126 is seen to be proximate and substantially parallel to lower edge 148 of the windshield. Lower bus bar 126 is in substantially continuous line contact with the lower edge 125 of the conductive layer 124. Similarly, substantially horizontally extending upper bus bar 128 is proximate and substantially parallel to upper edge 146 of the windshield and is in substantially continuous line contact with the upper edge 129 of the conductive layer 124. Thus, layer 124 electrically interconnects the upper bus bar 128 to the lower bus bar 126.

Electrical power is brought to the upper bus bar via two separate conductive paths 132 and 135, which are connected to a common electrical lead 140. They originate proximate one another below the lower bus bar on opposite sides of lower lead 130 of the lower bus bar. In this way the common electrical lead 140 may conveniently terminate in two solder pads, each of which would be soldered to a terminus 142, 143 of a respective one of the two conductive paths 132, 135 to the upper bus bar. Each such electrically conductive path according to this preferred embodiment extends generally horizontally in opposite directions from its corresponding terminus 142, 143 below the lower bus bar 126 and continues then upwardly, spaced laterally outward of respective lateral side edges 137, 138 of the conductive film 124 to respective opposite ends 150, 152 of the upper bus bar 128. Each of the conductive paths to the upper bus bar provides an alternative to the other in the event one of the two paths becomes nonconducting due to a minor fracture in the substrate or for other reasons. Lower lead 130 of lower bus bar 126 is seen to be connected at terminus 131 to power line 139. As in the case of the embodiment of FIGS. 1 and 2, power line 139 to the lower bus bar, in the case of a motor vehicle, preferably would connect the lower bus bar to the "hot" wire from the vehicle battery or, more preferably, the generator or alternator. Terminus 131 typically is soldered to a solder pad on the end of power line 139. Circuitry 145 corresponds to the fault detecting circuitry 45 described above in connection with the embodiment of FIGS. 1 and 2.

Referring now specifically to the right hand and left hand ends 150, 152 of the upper bus bar 128, each is seen to mirror the other. Lower edge 154 of upper bus bar 128 is seen to be recessed upwardly at end portions 156, 156'. The exact dimensions of the recess at each end would follow the principles discussed above in connection with the embodiment of FIGS. 1 and 2. In the preferred embodiment illustrated in FIG. 3, end portions 156, 156' are step recessed, that is, lower edge 154 of end portions 156, 156' is recessed by means of small radius turns 158 and 159 to a laterally extended straight portion 160, 160' which runs substantially parallel to the remainder of lower edge 154. Lower edge 154 is further recessed at the intersections 162, 162' of the upper bus bar 128 with the left boundary 137 and right boundary 138, respectively, of the electrically conductive film 124. Each such recess is seen to be a substantially semi-circular area recessed further from the lower bus bar than is the corresponding step recessed end portion 156, 156'.

While particular embodiments of the invention have been illustrated and described it will be apparent to those skilled in the art in view of the above disclosure that various changes and modifications may be made without departing from the invention, and the appended claims are intended to cover all such modifications and equivalents falling within the true spirit and scope of the invention.

We claim:

1. A substantially transparent, electrically heated vision unit comprising:
    a self-supporting substrate;
    an electrically conductive film partially covering a surface of said substrate; and
    a pair of opposed, elongate, electrically conductive bus bars, each having an elongate inward edge which faces the other and is in electrically conductive, overlapping contact with said film, a first bus bar of said pair of electrically conductive bus bars being spaced from, and substantially parallel to, a second bus bar of said pair of electrically conductive bus bars, one bus bar of said pair of electrically conductive bus bars extending from one end which forms an electrical junction with an electrically conductive lead, which lead is electrically isolated from said film other than through said first bus bar, to a distal end, said electrical junction being on an area of said surface of said substrate not covered by said film, said one bus bar intersecting said film at an intersection mediate said one end and said distal end, said inward edge of said one bus bar having a minor recess at said intersection away from the opposed bus bar;
    wherein an end of said second bus bar extends beyond a corresponding end of said first bus bar, and elongate end portion of the inward edge of said first bus bar at said corresponding end being step recessed away from said second bus bar.

2. The electrically heated windshield unit of claim 1 wherein said electrically conductive film only partially covers said surface of said substrate.

3. The electrically heated vision unit of claim 1 wherein said substrate is glass and said electrically conductive film comprises a film stack wherein an electrically conductive metal film is sandwiched between dielectric films.

4. The electrically heated vision unit of claim 3 wherein said surface of said substrate with said film thereon is a surface of a first self-supporting ply which is laminated to a second self-supporting ply by a flexible polymeric laminating layer between said first and second plys.

5. The electrically heated vision unit of claim 1 wherein the recessed end portion is step recessed, having a lateral dimension equal to about 1% to about 6% that of said first bus bar.

6. The electrically heated vision unit of claim 1 wherein the recessed end portion is step recessed, being recessed a dimension R which is equal to about one-half to about one-eighth the magnitude of the lateral dimension L of said recessed end portion.

7. A substantially transparent, electrically heated vision unit comprising:
   a self-supporting substrate;
   an electrically conductive film partially covering a surface of said substrate; and
   a pair of opposed, elongate, electrically conductive bus bars, each having an elongate inward edge which faces the other and is in electrically conductive, overlapping contact with said film, a first bus bar of said pair of electrically conductive bus bars being spaced from, and substantially parallel to, a second bus bar of said pair of electrically conductive bus bars, said first bus bar of said pair of electrically conductive bus bars extending from one end which forms an electrical junction with an electrically conductive lead, which lead is electrically isolated from said film other than through said first bus bar, to a distal end, said electrical junction being on an area of said surface of said substrate not covered by said film, said first bus bar intersecting said film at an intersection mediate said one end and said distal end, said inward edge of said first bus bar having a minor recess at said intersection away from the opposed bus bar;
   wherein an end of said second bus bar extends beyond said one end of said first bus bar, an elongate end portion of the inward edge of said first bus bar at said corresponding end being step recessed away from said second bus bar, said elongate end portion being mediate said intersection and said distal end and said minor recess at said intersection being recessed away from said second bus bar more than the step recessed end portion.

8. A substantially transparent, electrically heated vision unit comprising:
   a self-supporting substrate;
   an electrically conductive film partially covering a surface of said substrate; and
   a pair of opposed, elongate, electrically conductive bus bars, each having an elongate inward edge which faces the other and is in electrically conductive, overlapping contact with said film, a first bus bar of said pair of electrically conductive bus bars being spaced from, and substantially parallel to, a second bus bar of said pair of electrically conductive bus bars, one bus bar of said pair of electrically conductive bus bars extending from one end which forms an electrical junction with an electrically conductive lead, which lead is on a portion of said surface of said substrate which is not covered by said film and is electrically isolated from said film other than through said first bus bar, to a distal end, said electrical junction being on an area of said surface of said substrate not covered by said film, said one bus bar intersecting said film at an intersection mediate said one end and said distal end, said inward edge of said one bus bar having a minor recess at said intersection away from the opposed bus bar;
   wherein an end of said second bus bar extends beyond a corresponding end of said first bus bar, an elongate end portion of the inward edge of said first bus bar at said corresponding end being step recessed away from said second bus bar.

9. The electrically heated motor vehicle windshield of claim 8 wherein each said elongate end portion of said upper bus bar is step recessed away from said lower bus bar.

10. An electrically heated motor vehicle windshield having a generally trapezoidal shape, with a laterally extending lower edge, a laterally extending upper edge less wide than said lower edge, and right and left side edges extending from the lower to the upper edge, said windshield comprising:
    a substantially self-supporting, multi-ply, laminated substrate;
    an electrically conductive film stack partially covering a laminated surface of a ply of said substrate, said film stack comprising an electrically conductive metal film sandwiched between dielectric films; and
    a pair of opposed, elongated, electrically conductive bus bars on said laminated surface, each of said bus bars having an elongate inward edge which faces and is substantially parallel to the other and is in electrically conductive, overlapping contact with said film stack, an upper bus bar of said pair of bus bars being positioned proximate to said upper edge of said windshield, substantially parallel and substantially laterally coextensive therewith, and a lower bus bar of said pair of bus bars being positioned proximate said lower edge of said windshield substantially parallel and substantially laterally coextensive therewith, whereby said lower bus bar extends laterally at each end beyond said first bus bar, and elongate end portion of said inward edge at each end of said upper bus bar being recessed away from said lower bus bar, wherein said upper bus bar extends laterally to a distal end from a proximal end thereof which forms an electrical junction with an electrically conductive lead which is electrically isolated from said film stack except through said upper bus bar, said lead and said electrical junction both being on an area of said surface of said ply of said substrate not covered by said film stack, said upper bus bar intersecting a boundary of said film stack at an intersection mediate said proximal end thereof and the recessed elongate end portion at said proximal end thereof, said inward edge of said elongate end portion of said upper bus bar at said intersection being recessed away from said lower bus bar.

11. The electrically heated motor vehicle windshield of claim 10 wherein each end of said upper bus bar forms an electrical junction with a corresponding electrically conductive lead, which leads are electrically isolated from said film stack except through said upper bus bar, the leads and the electrical junctions being on an area of said surface of said ply of said substrate not covered by said film stack, said upper bus bar intersecting a right side and a left side boundary of said film stack at right side and left side intersections, respectively, each being mediate a corresponding end of said upper bus bar and the recessed elongate end portion at said corresponding end, said elongate end portion of said upper bus bar at each of said intersections being recessed away from said lower bus bar.

12. An electrically heated motor vehicle windshield having a generally trapezoidal shape, with a laterally extending lower edge, a laterally extending upper edge less wide than said lower edge, and right side and left side edges extending from the lower to the upper edge, said windshield comprising:

a substantially self-supporting, multi-ply, laminated substrate;

an electrically conductive film stack partially covering a laminated surface of a ply of said substrate, having side boundaries each of which is substantially parallel to, and spaced from, a corresponding one of said right side and said left side edges of said windshield, said film stack comprising an electrically conductive metal film sandwiched between dielectric films; and a pair of opposed, elongated, electrically conductive bus bars on said laminated surface, each of said bus bars having an elongate inward edge substantially laterally coextensive therewith which faces and is substantially parallel to each other and is in electrically conductive, overlapping contact with said film, an upper bus bar of said pair of bus bars being positioned proximate said upper edge of said windshield, being substantially parallel and substantially laterally coextensive therewith, and a lower bus bar of said pair of bus bars being positioned proximate said lower edge of said windshield, being substantially parallel and substantially laterally coextensive therewith, whereby said lower bus bar extends laterally at each end beyond said first bus bar, the inward edge of an elongate end portion at each end of said upper bus bar being step recessed away from said lower bus bar, said upper bus bar extends laterally to a distal end from a proximal end thereof, said proximal end forming an electrical junction with an electrically conductive lead which is electrically isolated from said film stack except through said upper bus bar, said lead extending to said electrical junction from a point proximate said lower edge of said windshield along a first one of the side edges of said windshield on surface area of said ply of said substrate not covered by said film stack, said upper bus bar intersecting a first one of said side boundaries of said film stack at an intersection mediate said junction and the step recessed end portin at said proximal end, the inward edge of said elongate end portion at said upper bus bar at said intersection being recessed, relative the step recess of said elongate end portion, away from said lower bus bar.

13. The electrically heated motor vehicle windshield of claim 12 wherein each said end portion is step recessed from about one-half to about one-eighth the lateral dimension of the end portion.

14. The electrically heated motor vehicle windshield of claim 12 wherein said upper bus bar has a lateral dimension of about forty-eight inches and the lateral dimension of each step recessed end portion of said upper bus bar is from about one to about three inches.

15. The electrically heated motor vehicle of claim 12 wherein said intersection is recessed a substantially semi-circular area having radius of about one-quarter inch.

16. The electrically heated motor vehicle windshield of claim 12 said distal end forms a second electrical junction with a second electrically conductive lead which is electrically isolated from said film stack except through said upper bus bar, said second lead extending from a second point proximate said lower edge of said windshield along a second one of the right side and left side edges of said windshield on surface area of said ply of said substrate to covered by said film stack, said upper bus bar intersecting a second one of said side boundaries of said film stack at a second intersection mediate said second electrical junction and the step recessed end portion at said distal end, the inward edge of the step recessed end portion at said distal end of said upper bus bar at said second intersection being recessed, relative the step recess of said elongate end portion at said distal end, away from said lower bus bar.

* * * * *